(12) United States Patent
Herald et al.

(10) Patent No.: US 7,556,026 B2
(45) Date of Patent: Jul. 7, 2009

(54) HYDROCARBON ADSORBER FOR AIR INDUCTION SYSTEMS

(75) Inventors: Michael L. Herald, Maumee, OH (US); Berry Carter, Newport Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 73 days.

(21) Appl. No.: 11/925,187

(22) Filed: Oct. 26, 2007

(65) Prior Publication Data

US 2008/0127949 A1 Jun. 5, 2008

Related U.S. Application Data

(63) Continuation-in-part of application No. 11/766,513, filed on Jun. 21, 2007.

(60) Provisional application No. 60/855,107, filed on Oct. 27, 2006.

(51) Int. Cl.
*F02M 37/20* (2006.01)
*F02M 35/10* (2006.01)
(52) U.S. Cl. .................. 123/516; 123/184.21
(58) Field of Classification Search ................. 123/516, 123/518, 519, 184.21
See application file for complete search history.

(56) References Cited

U.S. PATENT DOCUMENTS

| | | | | |
|---|---|---|---|---|
| 6,440,200 | B1 * | 8/2002 | Sakakibara et al. | 96/134 |
| 6,537,355 | B2 * | 3/2003 | Scardino et al. | 96/147 |
| 6,886,538 | B2 | 5/2005 | Lee et al. | |
| 6,997,977 | B2 * | 2/2006 | Dallas et al. | 96/153 |
| 7,086,384 | B2 | 8/2006 | Lee et al. | |
| 7,171,954 | B2 | 2/2007 | Oda et al. | |
| 2002/0029693 | A1 * | 3/2002 | Sakakibara et al. | 96/134 |

(Continued)

FOREIGN PATENT DOCUMENTS

JP 2003-28012 1/2003

(Continued)

OTHER PUBLICATIONS

International Search report Dated Feb. 26, 2008, International Application No. PCT/US2007/082660.

(Continued)

*Primary Examiner*—Thomas N Moulis
(74) *Attorney, Agent, or Firm*—Cantor Colburn LLP.

(57) ABSTRACT

An inlet conduit for an engine air induction system is provided, the inlet conduit having a plurality of openings located about a portion of the inlet conduit, the plurality of openings being disposed in a cavity of the inlet conduit; a hydrocarbon vapor-adsorbent member disposed in the cavity, the hydrocarbon vapor-adsorbent member covering the plurality of openings; and a covering member secured to the inlet conduit, the covering member being configured to cover and seal the hydrocarbon vapor-adsorbent member within the cavity, the covering member having an interior surface and an exterior surface, the interior surface facing the hydrocarbon vapor-adsorbent member while the exterior surface is flush with an exterior surface of the inlet conduit when the covering member is secured to the inlet conduit and wherein hydrocarbon vapors present in the air induction system after engine shutdown are substantially retained in the hydrocarbon vapor-adsorbent member until air flows through the air induction system after the engine starts.

19 Claims, 8 Drawing Sheets

U.S. PATENT DOCUMENTS

| | | |
|---|---|---|
| 2004/0025848 A1 | 2/2004 | Lee et al. |
| 2004/0079344 A1* | 4/2004 | Gimby et al. ............... 123/519 |
| 2005/0000362 A1* | 1/2005 | Bause et al. ................. 96/134 |
| 2005/0166884 A1 | 8/2005 | Lee et al. |
| 2005/0188962 A1 | 9/2005 | Oda et al. |
| 2006/0054142 A1* | 3/2006 | Burke et al. ............... 123/518 |

FOREIGN PATENT DOCUMENTS

| | | |
|---|---|---|
| JP | 2003-214264 | 7/2003 |
| JP | 2005-240677 | 9/2005 |
| JP | 2006-90252 | 4/2006 |

OTHER PUBLICATIONS

Written Opinion of International Searching Authority Dated Feb. 26, 2008, International Application No. PCT/US2007/082660.

* cited by examiner

ABOVE

DIRECT AIR FLOW PATH — 11

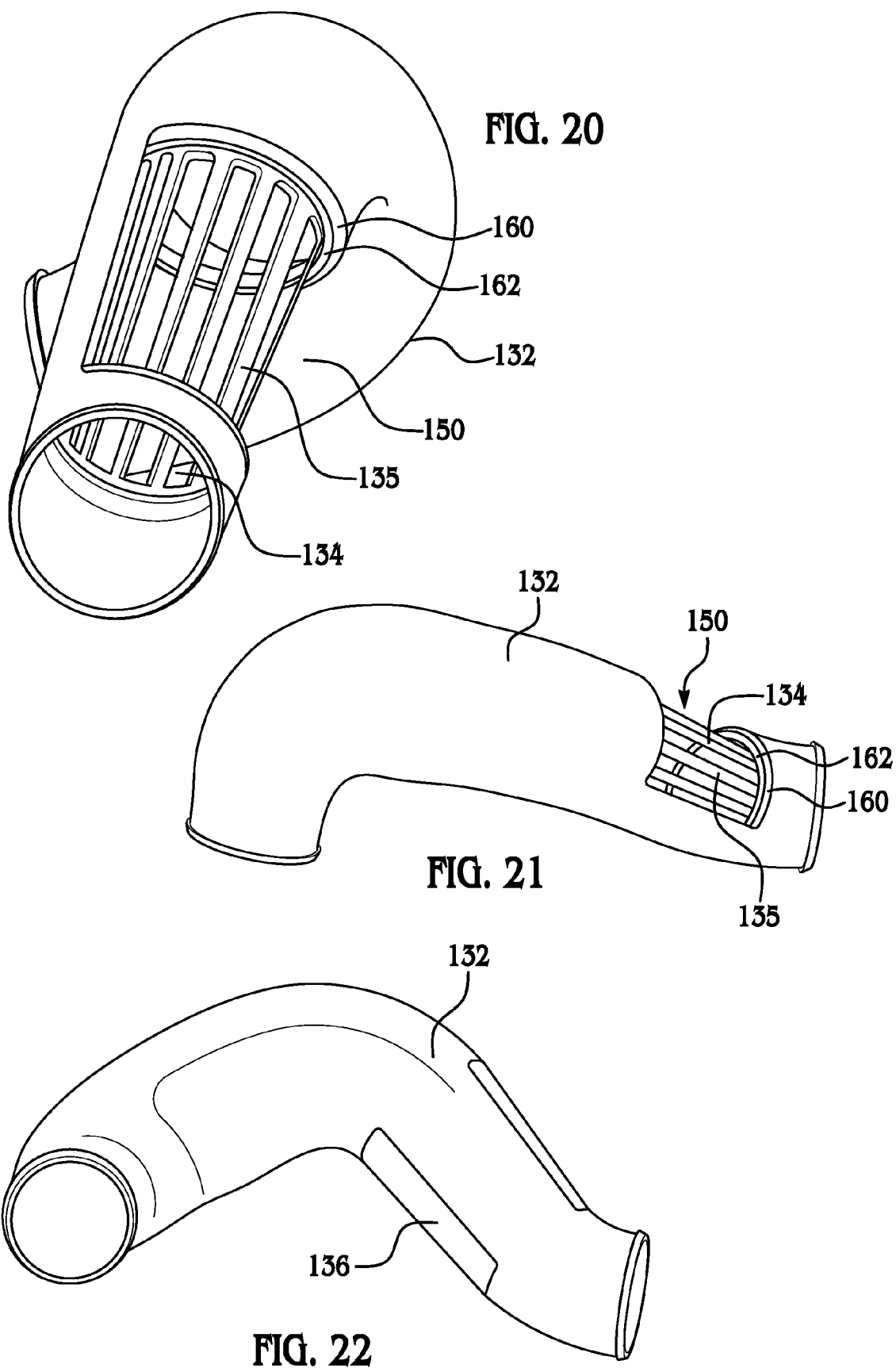

HYDROCARBON ADSORBER FOR AIR INDUCTION SYSTEMS

CROSS REFERENCE TO RELATED APPLICATIONS

This application claims the benefit of U.S. Provisional Patent Application Ser. No. 60/855,107, filed Oct. 27, 2006 the contents of which are incorporated herein by reference thereto.

This application is also a continuation-in-part U.S. Provisional Patent Application Ser. No. 11/766,513, filed Jun. 21, 2007 the contents of which are incorporated herein by reference thereto.

BACKGROUND

The present disclosure relates generally to adsorptive members and/or adsorptive filters, and more particularly to filters useful for adsorbing hydrocarbon vapors.

In internal combustion engines, while the engine is running, there is a constant flow of air through the air induction system into the intake manifold and finally into the combustion chamber through the intake valves. The airflow is caused by the intake stroke of the piston, which draws a vacuum on the intake manifold. This creates an imbalance of pressures between the intake manifold and the environment, and thus air rushes in through the air induction system. Due to the low internal pressure in the intake manifold and the constant airflow into the engine during engine operation, there are no evaporative emissions out through the inlet opening of the intake manifold or air induction system.

In addition, and when a fuel injected engine is running, a fuel system maintains the fuel in the fuel rail(s) at sufficient pressure to prevent the vaporization of the fuel even though the fuel rail(s) may be at a temperature sufficient to vaporize the fuel at normal atmospheric pressure. In fact, good restarting in part may depend on maintaining fuel rail pressure for a number of hours after shut down until the engine cools to prevent fuel vaporization in the fuel rail(s). Fuel vapor in the fuel rail(s) is generally undesirable in that it may lead to long crank times during engine start up.

After engine shut-down, air continues to rush through the air induction system until the intake manifold vacuum is eliminated. Evaporative hydrocarbons may be emitted if the pressurized fuel in the fuel rail(s) leaks into the intake manifold through the fuel injectors or un-combusted fuel in the system is present. This small amount of fuel may vaporize, and the hydrocarbon vapor may migrate out of the intake manifold through the inlet opening of the air induction system into the atmosphere. In the past, such hydrocarbon vapor egress was considered negligible. However, current regulations and environmental awareness have created the need to provide internal combustion engines wherein evaporative emissions from the air induction system are virtually zero.

Attempts to solve the problem of evaporative hydrocarbon emissions have included placing secondary, hydrocarbon adsorbing filters directly or across the direct air flow path. However, by disposing an extra layer of filtration media across this flow path causes an additional flow restriction to be placed upon the air induction system. As such, the engine is generally less efficient, or the air induction system may need to be sized larger in order to provide the same mass airflow with the increased restriction.

Other attempts have included combining hydrocarbon vapor-adsorbing materials with a standard particulate/contaminant air filter. Some drawbacks associated with these combination filters include the possibility of vapor-adsorbing material flaking out of the filter and entering the air system. The loss of adsorbent material may deleteriously affect the vapor adsorbence of the filter.

Accordingly, it is desirable to provide a filter, apparatus and method of manufacture wherein the hydrocarbon adsorber is capable of providing the desired hydrocarbon emission reduction without adversely affecting the performance of the air induction system.

SUMMARY OF THE INVENTION

The above-described and other features are appreciated and understood by those skilled in the art from the following detailed description, drawings, and appended claims.

An inlet conduit for an engine air induction system is provided, the inlet conduit having a plurality of openings located about a portion of the inlet conduit, the plurality of openings being disposed in a cavity of the inlet conduit; a hydrocarbon vapor-adsorbent member disposed in the cavity, the hydrocarbon vapor-adsorbent member covering the plurality of openings; and a covering member secured to the inlet conduit, the covering member being configured to cover and seal the hydrocarbon vapor-adsorbent member within the cavity, the covering member having an interior surface and an exterior surface, the interior surface facing the hydrocarbon vapor-adsorbent member while the exterior surface is flush with an exterior surface of the inlet conduit when the covering member is secured to the inlet conduit and wherein hydrocarbon vapors present in the air induction system after engine shut-down are substantially retained in the hydrocarbon vapor-adsorbent member until air flows through the air induction system after the engine starts.

In another exemplary embodiment a method for adsorbing hydrocarbon vapors from an air induction system of an internal combustion engine after engine shut down is provided, the method comprising: disposing an evaporative emissions filter in a cavity substantially outside of an air flow path defined by an inlet conduit of the air induction system, the cavity being located in a wall of the inlet conduit and is disposed above the air flow path defined by the inlet conduit and the evaporative emissions filter is disposed only on a portion of a cross section of the inlet conduit; and sealing the evaporative emissions filter in the cavity with a cover member, the cover member having an interior surface and an exterior surface, the exterior surface being flushly mounted to an exterior surface of the inlet conduit.

In accordance with one exemplary embodiment an inlet conduit for an engine air induction system is provided, the inlet conduit comprising:

DESCRIPTION OF THE DRAWINGS

FIGS. 12-22 illustrate other exemplary embodiments of the present invention.

DETAILED DESCRIPTION OF EXEMPLARY EMBODIMENTS

Figure 1:
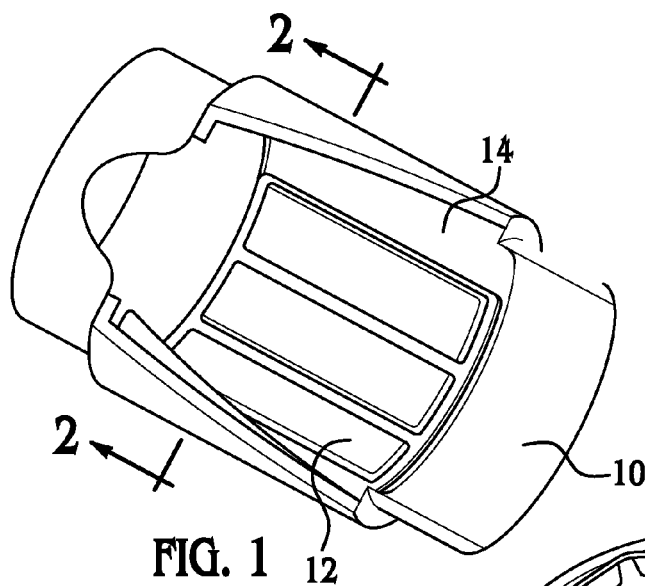
FIG. 1 is a partial cut away, perspective cross-sectional view of an air induction conduit having a hydrocarbon adsorber in accordance with an exemplary embodiment of the present invention.

This application is related to U.S. patent application Ser. No. 10/978,923, filed Nov. 1, 2004; Ser. No. 10/927,383, filed Aug. 26, 2004; Ser. No. 10/806,942, filed Mar. 23, 2004; and Ser. No. 10/392,044, filed Mar. 19, 2003 the contents each of which are incorporated herein by reference thereto.

In accordance with an exemplary embodiment, a hydrocarbon adsorber or hydrocarbon vapor-adsorbent member is located on the clean side of an air induction system having a radial seal filter. In one exemplary embodiment, the hydrocarbon adsorber or hydrocarbon vapor-adsorbent member is located within the radial seal filter. By placing the hydrocarbon adsorber within the radial seal filter, hydrocarbon adsorption is provided in a compact package space while not adversely affecting filter restriction. In order to properly locate the hydrocarbon adsorber a support structure will locate the adsorber and provide support for the adsorber under airflow conditions while the engine is running.

In accordance with exemplary embodiments, the adsorber will include the following constructions: spiral or layered carbon containing media wrapped or placed concentrically with an outer and/or an inner support structure, with the support structure being either metallic or molded plastic. In one embodiment, the support structure would be permanently attached to the clean side duct opening. In another embodiment, the adsorber would be removably mounted to a solid end of the radial seal filter, in this embodiment; the adsorber is removed during filter replacement and is thus placed into a new filter upon filter replacement. In yet another embodiment, the adsorber would be permanently mounted to a solid end of the radial seal filter, in this embodiment; the adsorber is removed and disposed of during filter replacement.

In another exemplary embodiment, the hydrocarbon adsorber is located around the outer diameter of a conduit or duct of the air induction system, wherein the adsorber is positioned to adsorb hydrocarbons within the air injection system during engine shutdown and wherein the hydrocarbon adsorber is positioned to adsorb hydrocarbons without disrupting air flow upstream of a mass airflow sensor positioned in the air induction system. Of course, the hydrocarbon adsorber can be located anywhere in the air intake system as long as it is in fluid communication with the hydrocarbons in the system. In this embodiment, the hydrocarbon adsorber and conduit or duct can be used in air induction systems having radial seal filters, flex panel filters or any other type of air filter housing as the hydrocarbon adsorber is located about the exterior of the conduit or duct of the air induction system.

In yet another exemplary embodiment, the hydrocarbon adsorber is positioned above and/or around a direct airflow path through the air induction system and the adsorber is positioned within a cavity of a conduit of the air induction system. In this embodiment, the carbon containing media is wrapped around the clean side duct, wherein the duct is perforated to allow hydrocarbon communication with the adsorber, and an outer shell seals the hydrocarbon adsorber from the environment and prevents hydrocarbon leakage to the atmosphere.

By locating the hydrocarbon adsorber on the outside diameter of the clean side duct, downstream of a mass airflow sensor, disturbance of fluids flowing past the mass airflow sensor is avoided as no restriction is introduced into the system. Thus, the inclusion of a hydrocarbon adsorber will not affect the flow path of the fluids through the system, which would have caused the mass airflow sensor to provide an indication that the air flow is outside a predetermined range, which is typically indicated by a "check engine" light being illuminated on the vehicle dashboard. In other words, the air inlet flow path will have the same configuration with or without the hydrocarbon adsorber placed therein.

In accordance with exemplary embodiments of the present invention, the construction of the carbon containing media could be any of the following methods: non-woven or woven cloth fabric formed into a pouch or bag containing loose wood based carbon or other equivalent hydrocarbon adsorbing materials such as coal or equivalents thereof. Carbon held together with binder between two thin sheets of non-woven material, such as KX Plekx or AQF media pleated around a center or outer support structure.

Figure 2:
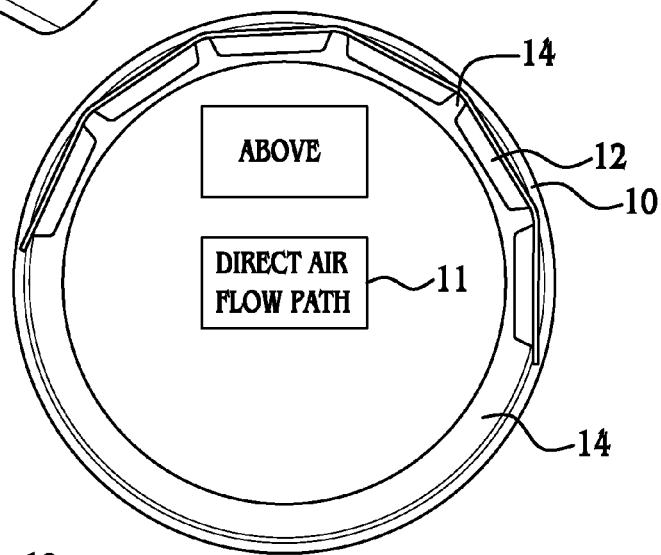
FIG. 2 is a cross-sectional view along lines 2-2 of the air induction conduit illustrated in FIG. 1.

Referring now to FIG. 1, a portion of a conduit or duct 10 positioned on the "clean air" side of an air filter of an air induction system is illustrated. In this embodiment, a hydrocarbon adsorber 12 is positioned within a cavity or receiving area 14 of the conduit thus, the hydrocarbon adsorber is positioned above a direct air flow path of the air induction system on the "clean air" side of an air filter disposed in the air induction system. As used herein cavity or receiving area 14 is intended to refer to an area configured to receive all or a portion of the hydrocarbon adsorber therein thus placing it outside a direct air flow path through the conduit. As used herein "clean air" side is intended to refer to portions of the air induction system or air filter that receives filtered air as it has already passed through a filter media of an air filter of the air induction system. In addition and in one embodiment, the hydrocarbon adsorber is located on only a portion of the conduit. Alternatively, the hydrocarbon adsorber can be positioned on the entire surface of the conduit. As shown in a non-limiting embodiment of FIG. 2, the hydrocarbon adsorber is positioned above a direct air flow path 11 on an interior surface of the air induction system. Contrary to the methodology behind prior hydrocarbon adsorbing devices the hydrocarbon molecules of the fuel do not necessarily travel in a direct path thus, barrier types of hydrocarbon adsorbers or other types of hydrocarbon adsorbers relying on non-random movement of the hydrocarbon molecules do not guarantee that the desired amount of hydrocarbons will be adsorbed by the filter. Moreover, barrier types of filters or other types of filters in the direct air flow path also restrict fluid flow through the system. This random movement of the molecules is attributable to the Brownian movement of the molecules. Alternatively and as applications require the hydrocarbon adsorber may be disposed on the entire surface of the conduit or portions thereof either above, below and/or besides the direct air flow path as long as the desired amount of hydrocarbon adsorbtion is provided while also preventing disruption of the air or fluid flow causing the mass air flow sensor to indicate air flow rates outside of a desired range.

If hydrocarbon vapors are present in the air induction system after engine shutdown, the hydrocarbon vapors are substantially retained in the hydrocarbon adsorbent until air flows through the air induction system after the engine starts. Thereafter, the return of airflow through the air induction system substantially regenerates the hydrocarbon adsorbent by pulling away the adsorbed hydrocarbon molecules for incineration in the combustion chamber of the engine.

In accordance with an exemplary embodiment of the present invention, the hydrocarbon adsorber is constructed in accordance with the teachings of U.S. patent application Ser. No. 10/978,923, filed Nov. 1, 2004; Ser. No. 10/927,383, filed Aug. 26, 2004; Ser. No. 10/806,942, filed Mar. 23, 2004; and Ser. No. 10/392,044, filed Mar. 19, 2003 the contents each of which are incorporated herein by reference thereto. Furthermore and as will discussed herein, the hydrocarbon adsorber is placed outside of the direct air flow path since the inventors of exemplary embodiments of the present invention have discovered that due to Brownian movement of the hydrocarbon molecules (e.g., random movement of the molecules and collisions with each other and the housing) as well as temperature differences and the confined space of the housing, the hydrocarbons do not travel in the same direction and thus, the hydrocarbon adsorber of the present invention is not required to be a barrier type device (e.g., the air must past through) or other type of device relying on non-random movement of the hydrocarbon molecules. Moreover, the hydrocarbon adsorber may displaced only on a portion of the housing of the air induction system and in some non-limiting instances only above the direct air flow path since the molecules travel randomly contrary to prior beliefs that hydrocarbon molecules travel in non-random fashion and/or settle out in the bottom of the system.

Examples of the hydrocarbon vapor-adsorbing material for the hydrocarbon adsorber include, but are not limited to at least one of activated carbon, wood based carbon, zeolites, cyclodextrins, hydrophobic cellulose, liquid phase absorbents (e.g. silicon oils), and/or mixtures thereof. In a non-limiting exemplary embodiment of the present disclosure, the adsorbent member 12 has as a main component comprising activated carbon. It is to be further understood that the hydrocarbon vapor-adsorbing material may be in any suitable form and housed/impregnated within any suitable media.

In one embodiment, the hydrocarbon-vapor adsorbing material may be contained by one or more fine mesh screens, it being understood that the fine mesh screen(s) may be formed from any suitable materials, including but not limited to polymeric materials, metal materials, and/or mixtures thereof. One non-limitative example of a suitable polymeric material is polyvinylidene chloride, commercially available from Dow Chemical in Midland, Mich. under the trade name SARAN.

Some non-limitative examples of carbon impregnated filtration structures are commercially available from AQF Technologies LLC in Charlotte, N.C. Other suitable non-limitative examples of adsorbent media are disclosed in U.S. Pat. No. 5,486,410, which is incorporated by reference herein in its entirety. The 410 patent discloses, among other embodiments, a filtration structure of a composite staple having a nylon sheath and a polyester core, with activated carbon particles bonded to the fiber matrix, and including a micro fiber web located within the structure. Yet other suitable adsorbent media include activated carbon commercially available from PICA USA, Inc. in Columbus, Ohio. It is further believed that wood based carbon may provide certain advantages, such as for example, in regeneration of the carbon bed. Of course, other types of carbon can also be used.

The polymeric material may be a natural material, a synthetic material, and/or a mixture of natural and synthetic materials. It is to be understood that any polymeric material that is capable of being formed as a porous material may be used. In an embodiment, the polymeric material is extruded into fibers which are woven. In an alternate embodiment, the polymeric material is a porous non-woven material. The polymeric material can be chemically similar enough to be fastened together, if such fastening is accomplished by other than a mechanical means (e.g., adhesives, ultrasonic welding and other attachment methods).

Generally, the porous polymeric materials for the layers of the hydrocarbon vapor adsorbent member are configured to have a pore size/mesh size large enough to allow the desired adsorbate to pass through, yet small enough to prevent the adsorptive media from passing through. In an embodiment, the porous polymeric materials' pore size may range, for example, between about 1 µm and about 2000 µm. In a further embodiment when an adsorptive media having a relatively large average particle size is used (e.g. carbon pellets), the porous polymeric materials' pore size may range, for example, between about 200 µm and about 2000 µm. In yet a further embodiment in which an adsorptive media having a smaller average particle size is used (e.g. granular carbon), the porous polymeric materials' pore size may range, for example, between about 100 µm and about 200 µm. In still a further embodiment in which an adsorptive media having a relatively fine average particle size is used (e.g. powdered carbon), the porous polymeric materials' pore size may range, for example, between about 1 µm and about 100 µm.

It is to be understood that any suitable porous polymeric material may be used that is substantially permeable to the desired adsorbate, yet substantially impermeable to the adsorptive media. Some non-limitative examples of suitable polymeric materials include, but are not limited to polyesters, polypropylenes, vinyl copolymers, polycarbonate, acetal, polyvinyl chloride, polyamides, and/or mixtures thereof. It is to be understood that the layers of the hydrocarbon vapor adsorbent member may have any suitable thickness. In one non-limiting example, the thickness of each of the layers 12, 14 may range between about 0.007 inch (177.8 µm) and about 0.014 inch (355.6 µm).

Figure 3A:
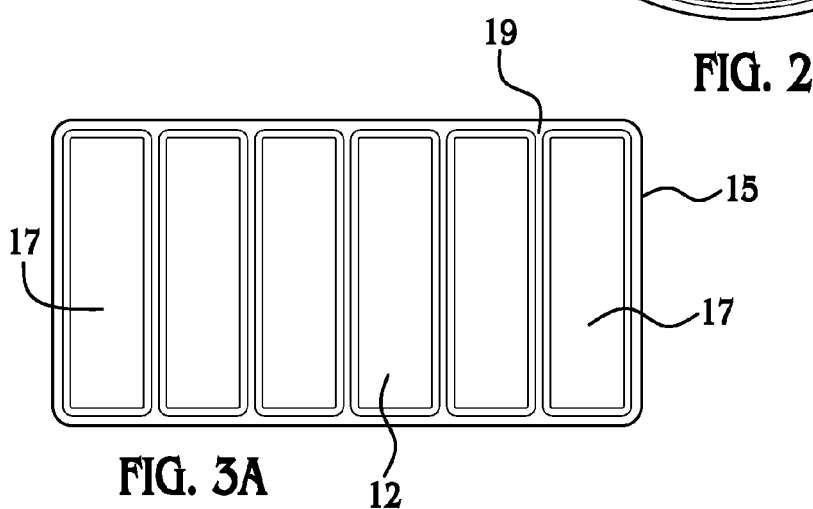
FIGS. 3A-3C are schematic views of a hydrocarbon adsorber element contemplated for use in the conduit illustrated in FIGS. 1 and 2 as well as other exemplary embodiments depicted in the Figures.
Figure 3B:
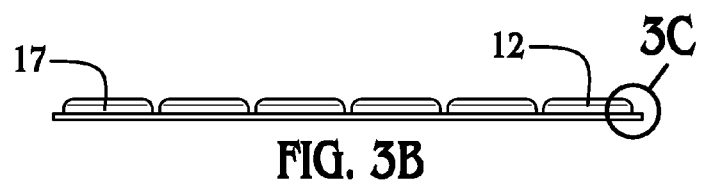
Figure 3C:
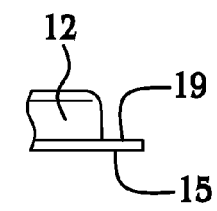

Referring now to FIGS. 3A-3C, a non-limiting exemplary embodiment of a hydrocarbon adsorber or hydrocarbon adsorbing element of the present invention is illustrated. Here the hydrocarbon adsorber is formed with a plurality of cells 17 each of which are spaced apart and contain an amount of hydrocarbon adsorbing material (e.g., carbon) within the cells. In accordance with an exemplary embodiment the hydrocarbon adsorber is formed by a pair of permeable layers mentioned above wherein at least one of the layers is formed to have the plurality of cells therein and the other layer is a backing layer, which when sealed together by a suitable process (e.g., ultrasonic welding, adhesives, heat staking etc.) forms the hydrocarbon adsorber.

Accordingly, the hydrocarbon adsorber comprising the two layers, a plurality of carbon containing cells each of which spaced apart from each other comprises a flexible member that is easily conformed to the contours of the conduit of the air induction system.

Accordingly, and in accordance with an exemplary embodiment of the present invention the hydrocarbon adsorbing element is secured to the cavity of the conduit of the air induction system. In accordance with an exemplary embodiment the hydrocarbon adsorbing element is secured to the conduit via a plurality of mechanical fasteners and/or adhesives.

Figure 4:
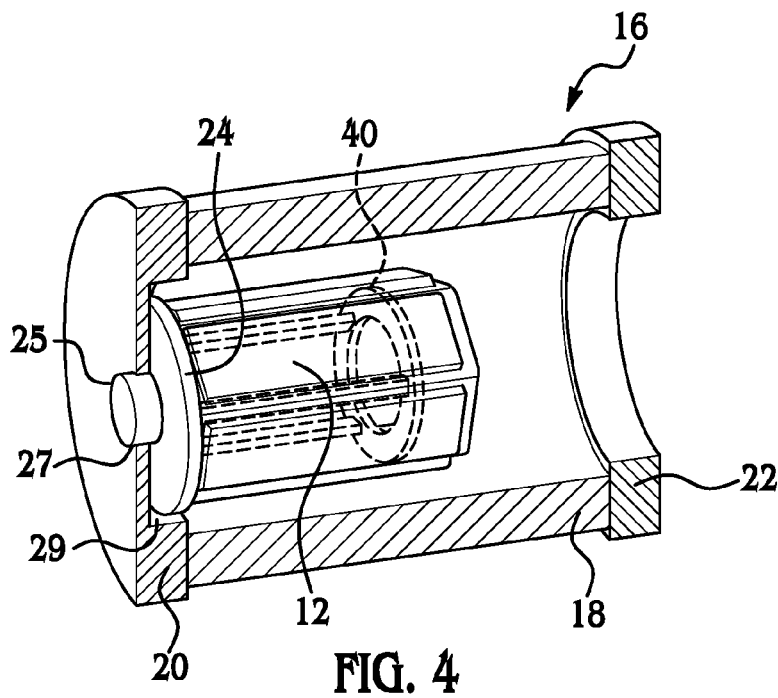
FIG. 4 is a perspective cross-sectional view of an air filter having a hydrocarbon adsorber in accordance with another exemplary embodiment of the present invention.
Figure 5:
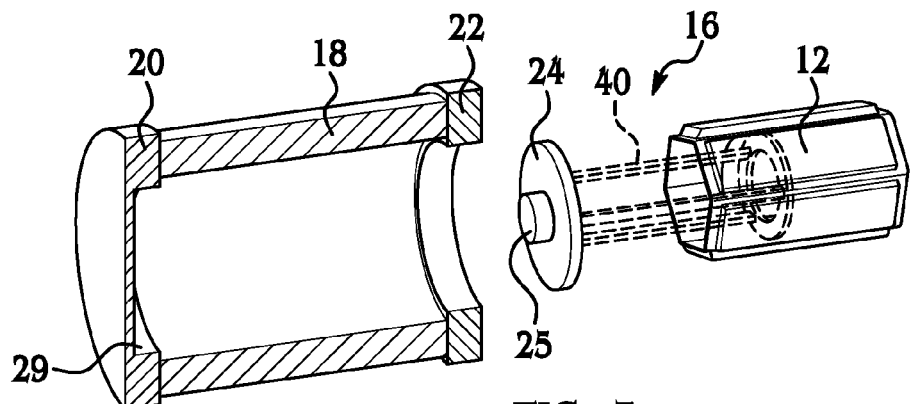
FIG. 5 is an exploded view of the air filter/hydrocarbon adsorber assembly depicted in FIG. 4.

Referring now to FIGS. 4 and 5, another exemplary embodiment of the present invention is illustrated. Here, a radial seal filter 16 is configured to have a hydrocarbon adsorber 12 removably secured thereto. In this embodiment, the radial seal filter comprises a ring of filter media 18 having a closed end portion 20 and an open ring portion 22 configured to secure the radial seal filter to an inlet conduit of an air induction system. In accordance with an exemplary embodiment of the present invention the ring of filter media is any type of media suitable for air filter applications one non-limiting type of media is a non-woven media commercially available from Hollingsworth & Vose as BW3, a 3 oz/yd$^2$ polyester non-woven media, BW4 (4 oz) and 7322 (high loft) media. Of course, other alternative materials are capable of providing the ring of filter media other non-limiting examples include cellulose based media or synthetic media.

As is known in the related arts end portion 20 and ring portion 22 are formed from resilient polymeric materials formed from liquid castable materials such as urethane that are potted onto the end of the media to form end portion 20 and ring portion 22 and in some instances the closed end portion may be formed from a stamped metal. Of course, media 18, closed end portion 20 and open ring portion 22 can be formed from any material known to those skilled in the related arts namely the air filtration arts in particular radial seal filters (e.g., providing a filter media between a compressible ring portion for securement onto the inlet conduit and a closed end portion). In accordance with an exemplary embodiment, the radial seal filter is positioned within a housing (not shown) wherein unfiltered air is introduced in a flow path that travels through the media of the filter element and out through the open ring portion and into the inlet conduit of the air induction system wherein the filtered air is then received into for example, an internal combustion engine.

In this embodiment, the hydrocarbon adsorber is fixedly secured to a mounting member 24 configured to be removably secured to the closed end portion by for example, a spud or feature 25 configured to releasably engage an opening 27 or feature in the closed end portion. Depending on the type of material used for the closed end portion, the opening can be formed during the potting process (e.g., feature in the mold) or stamped or punched from the material. A non-limiting example of such a mounting configuration is illustrated in FIGS. 4 and 5. One non-limiting exemplary embodiment would be a plastic or metal mounting member configured to engage the closed end while engaging and supporting the hydrocarbon adsorber. In accordance with an exemplary embodiment of the present invention the hydrocarbon adsorber is mounted to the frame and/or mounting member by any suitable means including fasteners, screws, heat staking etc. Also, the mounting member is also capable of being secured to the closed end by a fastener, which depending on the embodiment either removable secures the mounting member to the closed end or permanently secures the mounting member to the closed end.

As illustrated, mounting member 24 is configured to be received within a cavity 29 formed in the end cap or closed end portion 20. Of course, end portion 20 may be configured to not have cavity 29. In this embodiment, feature 25 is configured to releasably engage opening 27 via a plurality of features on either or both items thus; member 24 is releasably secured to the end portion to allow for removal and replacement of the hydrocarbon adsorbing member.

In accordance with an exemplary embodiment, the mounting member 24 is configured to support the hydrocarbon adsorbing member within the inner clean side of the radial seal filter. In one non-limiting exemplary embodiment an end of the hydrocarbon adsorber is fixedly secured to the mounting member thus allowing removal and replacement of the hydrocarbon adsorbing element from the air filter. As shown in FIG. 4, the hydrocarbon adsorber is configured and positioned to leave an unobstructed flow path though the filter media 18 into the opening defined by the ring portion 22, which is configured to sealingly engage the inlet conduit of an air induction system.

In another alternative exemplary embodiment and as illustrated by the dashed lines in FIGS. 4 and 5, a supporting frame or structural member 40 is received within the hydrocarbon adsorbing member. In this embodiment, the frame is fixedly secured to the mounting member and the hydrocarbon adsorber disposed about and supported by the frame. Alternatively, the hydrocarbon adsorber is located within the frame or support structure. As shown, the hydrocarbon adsorber is wrapped around the frame and an open end of the hydrocarbon adsorber is provided to provide fluid communication to both the inner and outer surface areas of the hydrocarbon adsorber in order to provide additional active surface area.

In this embodiment and since the mounting member is releasably secured to the end portion of the filter, the hydrocarbon adsorber can be removed from the radial seal filter when the same is being exchanged for a new filter. This allows for the hydrocarbon adsorber to have an extended life since the hydrocarbon adsorber will typically last longer than the air filter into which the same is disposed as the hydrocarbon adsorber is continuously regenerated via air flow past the hydrocarbon adsorber. Accordingly and during filter replacement, the hydrocarbon adsorber is removed from the dirty air filter and then the hydrocarbon adsorber is secured within the new radial filter. In this embodiment, the adsorber would be removably mounted to the solid end of the radial seal filter, wherein the same is capable of being removed and placed into a new filter upon filter replacement. Of course, the new filter would have a solid end cap 20 configured to releasably receive (e.g., mounting openings) the mounting member of the hydrocarbon adsorber therein. In another alternative embodiment, the frame is fixedly secured to the filter and only the hydrocarbon adsorber is removed and replaced. Again, the new filter would have a frame or supporting structure for the hydrocarbon adsorber.

In yet another alternative embodiment, the hydrocarbon adsorbing member is permanently secured to the solid end of the radial seal filter and is thrown out with the filter as the filter is being replaced. The permanent mounting of the hydrocarbon adsorbing member to the filter may be accomplished by anyone of the aforementioned mounting means.

Figure 6:
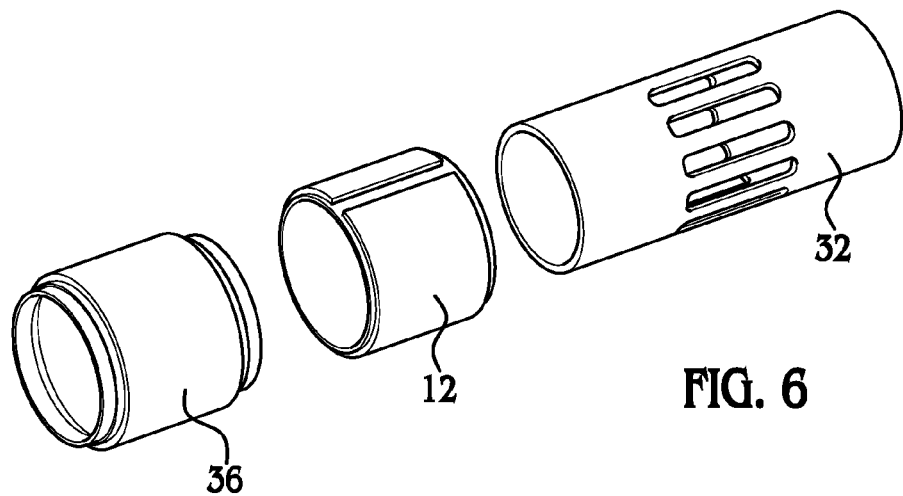
FIG. 6 is an exploded view of a hydrocarbon adsorber assembly in accordance with another alternative exemplary embodiment of the present invention.
Figure 7:
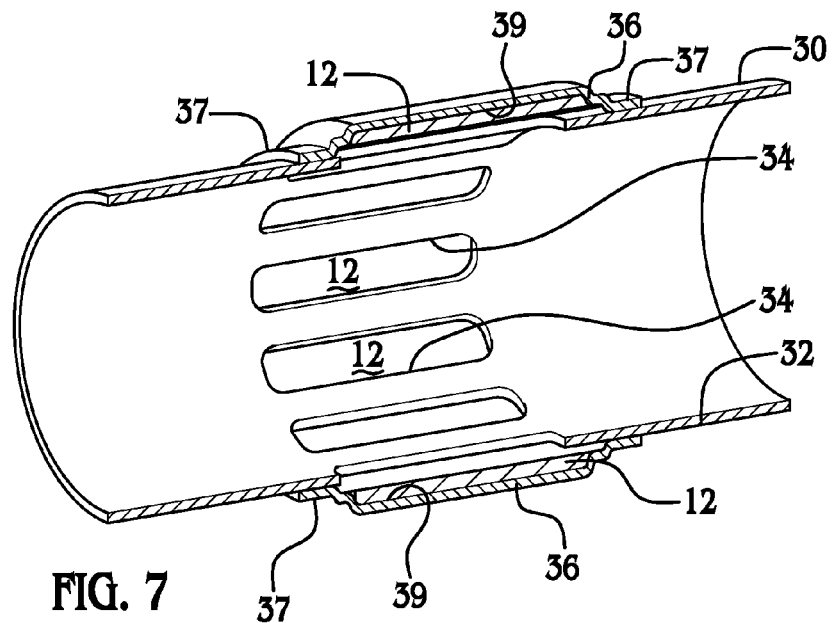
FIG. 7; is a perspective cross-sectional view of an intake conduit having a hydrocarbon adsorber in accordance with the exemplary embodiment illustrated in FIG. 6.

Referring now to FIGS. 6 and 7, yet another alternative exemplary embodiment is illustrated. Here, the hydrocarbon adsorber (e.g., carbon containing media of which one non-limiting example illustrated in FIGS. 3A-3C) is configured to be slid on or wrapped around the entire diameter or peripheral portion of a distinct section of an exterior surface 30 of a clean side duct or conduit 32, wherein the duct is perforated with openings 34 to allow hydrocarbon communication with the adsorber, and an outer solid shell or covering member 36 seals the hydrocarbon adsorber from the environment and prevents hydrocarbon leakage into the atmosphere.

In this embodiment, the conduit is configured to have one end in fluid communication with the clean side of the air filter and the other end is in fluid communication with the internal combustion engine receiving air flow from the air induction system. The hydrocarbon adsorber and shell 36 are configured to wrap around all of a portion of a diameter or peripheral portion of a distinct section of the conduit and the shell seals the hydrocarbon adsorber about the exterior of the conduit. In accordance with an exemplary embodiment of the present invention the hydrocarbon adsorber and the shell portion and/or the materials comprising the shell and the hydrocarbon adsorber are flexible (e.g., flexible plastics, polymers, nylons or equivalents thereof) in order to be wrapped around the exterior of the inlet conduit or alternatively and if the hydrocarbon adsorber and the shell portion are more rigid they are configured to wrap around the exterior of the inlet conduit and the shell is configured to sealingly enclose the hydrocarbon adsorber to the inlet conduit.

In accordance with an exemplary embodiment the hydrocarbon adsorber is either wrapped around the exterior of the clean side conduit or slid over the exterior surface of the conduit. In addition and in accordance with an exemplary embodiment the shell is also slid on or wrapped around the conduit and then the shell is secured to the conduit via adhesives or any other suitable mechanical mounting means (e.g., ultrasonic welding, heat staking or equivalents thereof). For example, the shell or sealing member is in one non-limiting exemplary embodiment ultrasonically welded to the conduit. In this embodiment, the conduit and the shell or sealing member is formed from a polymeric material such as plastic suitable for ultrasonic welding or heat staking. If the hydrocarbon adsorber and the covering member or shell is slid or wrapped onto the conduit the same are obviously configured to have enough clearance to be positioned about the conduit and in the case of the shell the conduit and the hydrocarbon adsorber alternatively and/or in addition to configuring the hydrocarbon adsorber and the shell to slid over the conduit the shell and the hydrocarbon adsorber may each be cut or split in the ring shaped member of the hydrocarbon adsorber and the shell to allow expansion of the ring of the shell and the hydrocarbon adsorber so as to allow the same to be disposed over the exterior of the conduit. Thereafter and once in the desired location, the shell and hydrocarbon adsorber are then pushed back together along the split line or snap back together due to the resilient characteristics of the hydrocarbon adsorber and the shell and the same are then secured to the conduit. The expansion and contraction of the shell and the hydrocarbon adsorber would be possible due to the flexible materials (e.g., nylon, plastic, polymers, synthetics and equivalents thereof) contemplated for the same.

In one non-limiting example and as illustrated in FIG. 7, the shell has a pair of flange portions 37 or at least one flange portion for securement to the conduit and the shell defines a cavity 39 to receive the hydrocarbon adsorber therein thus, the cavity receives the hydrocarbon adsorber therein and the flanges are secured to the conduit on the exterior surface outside of the peripheral openings of openings 34. In another alternative exemplary embodiment, the conduit may be configured to have features to receive the flange portions therein.

As illustrated, a portion of the duct or conduit 32 is shown and the hydrocarbon adsorber is wrapped around the exterior of the duct and fluid communication between the hydrocarbon adsorber and the interior of the duct is provided through openings 34. Thereafter, the shell or sealing member 36 is secured to the conduit and the hydrocarbon adsorber is retained therein, wherein the sealing of the shell to the exterior of the conduit prevents adsorbed hydrocarbons of the hydrocarbon adsorber from exiting the conduit. Thus, the hydrocarbon adsorber is located around the outer diameter of the conduit or duct of the air induction system, wherein the adsorber is positioned to adsorb hydrocarbons within the air injection system through openings 34 during engine shutdown and wherein the hydrocarbon adsorber is positioned to adsorb hydrocarbons without disrupting air flow upstream of a mass airflow sensor positioned in the air induction system. In accordance with an exemplary embodiment of the present invention the size of the hydrocarbon adsorber, the size and number of openings 34 is determined by the amount of required hydrocarbon adsorber surface area for the desired performance (e.g., adsorbtion of hydrocarbon molecules during engine shut down). For example, in one exemplary embodiment the openings 34 are disposed about an entire peripheral portion of the inlet conduit and the covering member or shell is configured to cover all the openings and the hydrocarbon adsorber is configured all or some of the openings to provide the desired amount of adsorbtion through openings 34. Alternatively, only a portion of the periphery of the conduit has openings 34 and the hydrocarbon adsorber and the shell or covering member are configured to cover the same. Again and in this embodiment, the hydrocarbon adsorber and shell or covering member can be configured to cover all of an entire periphery of the conduit or only a portion of the conduit, which may be above, besides, below or completely around the direct air flow path.

In this embodiment, the hydrocarbon adsorber and conduit or duct can be used in air induction systems having radial seal filters, flex panel filters or any other type of air filter housing as the hydrocarbon adsorber is located about the exterior of the conduit or duct of the air induction system and will not interfere with the air or fluid flow through the conduit. In one non-limiting exemplary embodiment the hydrocarbon adsorber is located on a conduit that is in fluid communication with the clean side of the air filter. Of course and if applications and performance criteria permit the hydrocarbon adsorber is mounted to an inlet conduit of the air induction system (e.g., the conduit that feeds air into the air filter of the system).

Figure 8:
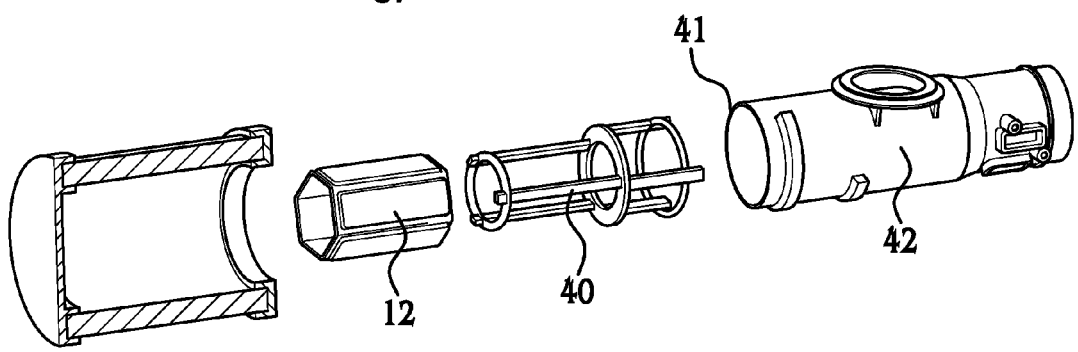
FIG. 8 is an exploded view of an air filter/hydrocarbon adsorber assembly in accordance with another exemplary embodiment of the present invention.
Figure 9:
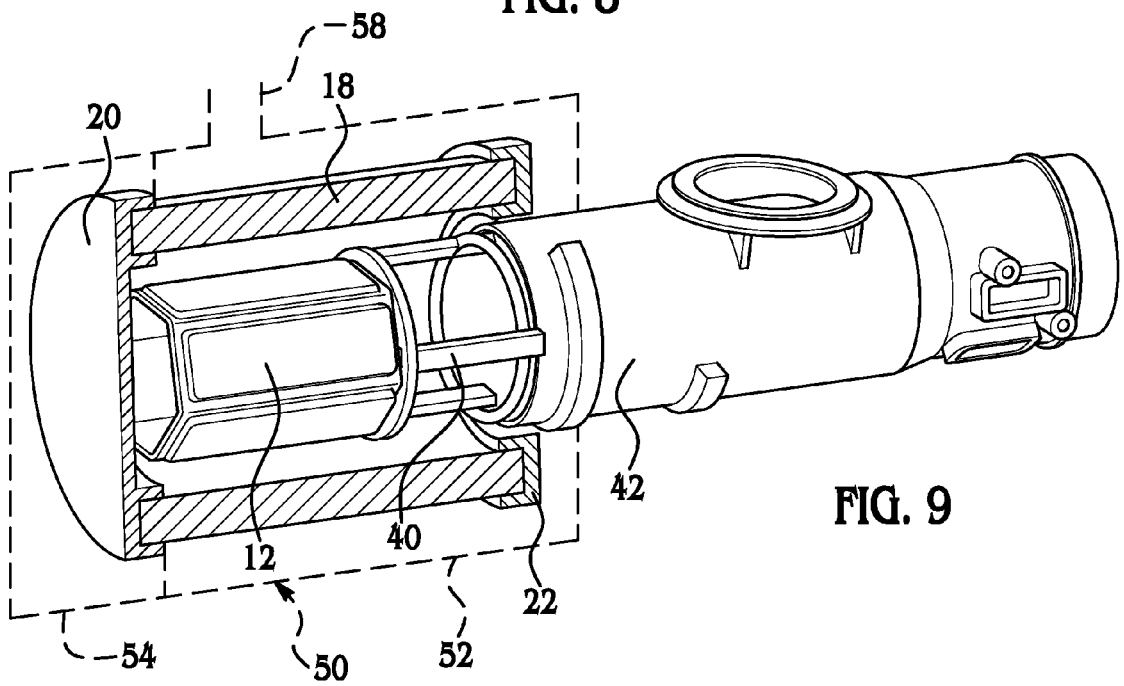
FIG. 9; is a perspective cross-sectional view of an air filter having a hydrocarbon adsorber in accordance with the exemplary embodiment illustrated in FIG. 8.

Referring now to FIGS. 8 and 9, yet another alternative exemplary embodiment is illustrated. Here, the hydrocarbon adsorber (e.g., carbon containing media) is mounted to a structure or supporting frame 40, which is fixedly secured to an inlet end 41 of an inlet duct 42 of an air induction system. In this embodiment, the hydrocarbon adsorber is fixedly secured to the inlet duct so that the adsorber remains secured thereto when the radial seal filter is removed and replaced. In other words, the radial seal filter is disposed about the hydrocarbon adsorber when it is secured to the conduit and a housing with an air inlet is disposed about the radial seal filter.

In accordance with an exemplary embodiment of the present invention and as illustrated by the dashed lines in FIG. 9 a two piece housing 50 comprising a first portion 52 and a second portion 54 with an inlet 56 is configured to be secured about the radial seal filter in addition to being secured to the inlet conduit 42. In this embodiment, the second portion is configured to be removably secured to the first portion, which is secured to the inlet conduit 42. Accordingly, the housing is configured for removal and replacement of the air filter during use. Of course, this is but one non-limiting example and the housing may have any other suitable configuration.

As in the previous embodiment, the radial seal filter is configured to have a ring of filter media having a closed end portion and an open ring portion configured to secure the radial seal filter to the inlet conduit of an air induction system and the hydrocarbon adsorber comprises spiral or layered carbon containing media, wrapped or placed concentrically with an outer and/or inner support structure or stand off 40. In one exemplary embodiment, the structure 40 and hydrocarbon adsorber 12 is configured such that the hydrocarbon adsorber is spaced away from the opening of the conduit so that un-impeded flow of filtered fluid may pass through media 18 into the opening of conduit 42. As illustrated, structure 40 has a plurality of ring members of various diameters secured to each other by a plurality of structural members, which provide a support and/or mounting surface for the hydrocarbon adsorber and in this embodiment position the hydrocarbon adsorber away from the inlet end of the conduit.

In addition, the hydrocarbon adsorber is wrapped around the frame or support structure and an open end of the hydrocarbon adsorber is provided at either end to provide fluid communication to both the inner and outer surface areas of the hydrocarbon adsorber in order to provide additional active surface area. Alternatively, the hydrocarbon adsorber is located within the frame or support structure. Moreover, fluid flow is capable of passing through the hydrocarbon adsorber as it configured into a cylindrical or tube shape with open ends. Also, fluid flow is capable of passing around the exterior of the hydrocarbon adsorber or may flow directly from the media into the inlet conduit due to the spaced relationship of the hydrocarbon adsorber to the open end of the inlet conduit. Of course, it is contemplated that exemplary embodiments are directed to filters and conduits wherein the hydrocarbon adsorber and the complimentary support structure may have numerous configurations other than those specifically shown in the attached drawings.

In addition, and in accordance with an exemplary embodiment, the support structure is either metallic or molded plastic or any other suitable type of material, and in this embodiment the structure is permanently attached to the clean side duct opening of the inlet conduit 42 via welding, fasteners and/or adhesives. In addition and in one embodiment, the hydrocarbon adsorber is welded or heat staked to a nylon support structure or stand off of the structure 40. In this embodiment, the hydrocarbon adsorber can be secured to the frame before or after the frame is secured to the inlet conduit or vice versa.

Construction of the carbon containing media could be any of the following methods: Non woven or woven cloth fabric formed into a pouch or bag containing loose wood based carbon or other equivalent hydrocarbon adsorbing media; carbon held together with binder between two thin sheets of non-woven material, such as KX Plekx or PLEKX available from KX industries or AQF media; and KX Plekx or AQF media pleated around a center or outer support structure.

Without being bound to any theory, it is believed that exemplary embodiments of the present invention advantageously increase the probability of interaction with and subsequent capture of the desired adsorbate. Further, by placing the hydrocarbon adsorber within the radial seal filter, hydrocarbon adsorption is attained in a compact package space while not adversely affecting filter filtration. In addition, and by placing the hydrocarbon adsorber within the radial seal filter, the support structure locates the adsorber and provides support for the adsorber under airflow conditions while the engine is running. Moreover, and by locating the adsorber around the outside diameter of the clean side duct, downstream of a mass airflow sensor, disturbance to the mass airflow sensor is avoided, and no restriction is introduced to the system.

In one non-limiting example, the embodiment of FIGS. 8 and 9 (e.g., internal to the clean side of the air filter with a nylon stand-off) was tested with the following results: performance, restriction=0.6" H2O rise over baseline, breakthrough=95%, restriction was run without the stand-off cage in place. There will be little change in restriction with cage in place.

Figure 10:
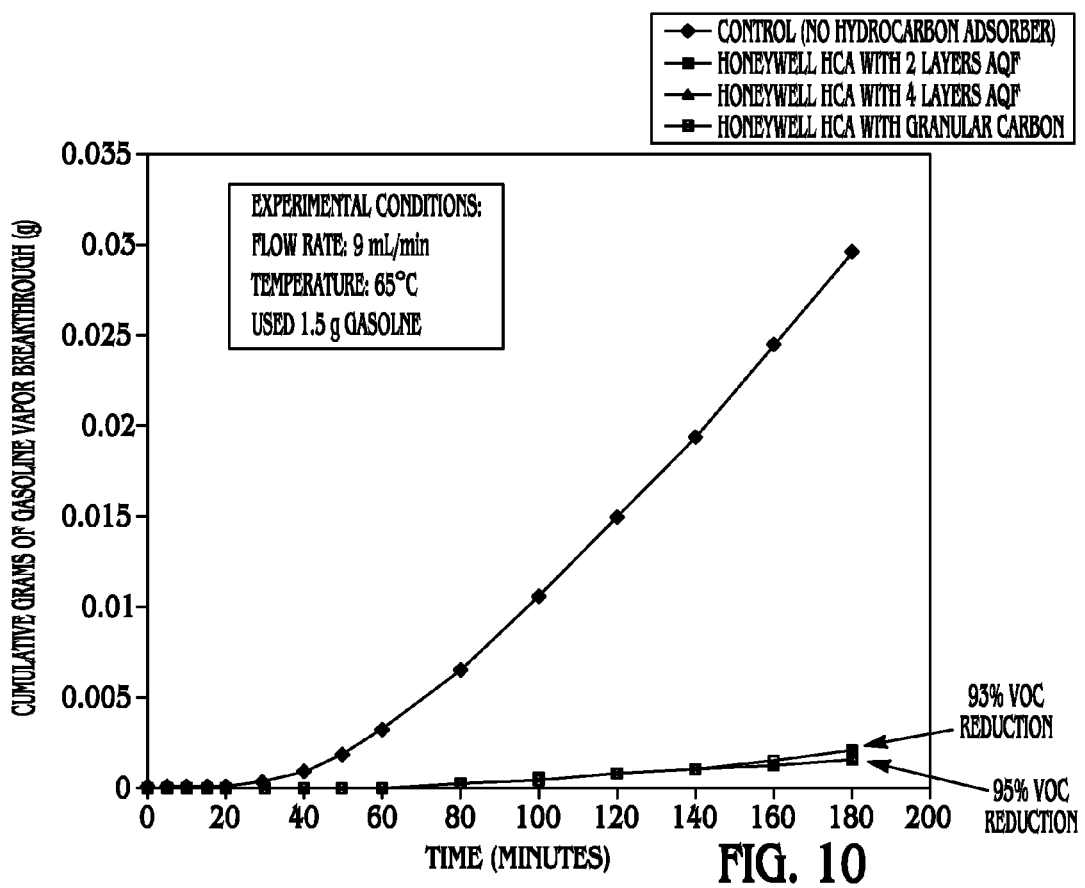
FIGS. 10 and 11 are graphs illustrating cumulative grams of gasoline vapor breakthrough vs. time with regard to various exemplary embodiments as well as controls.
Figure 11:
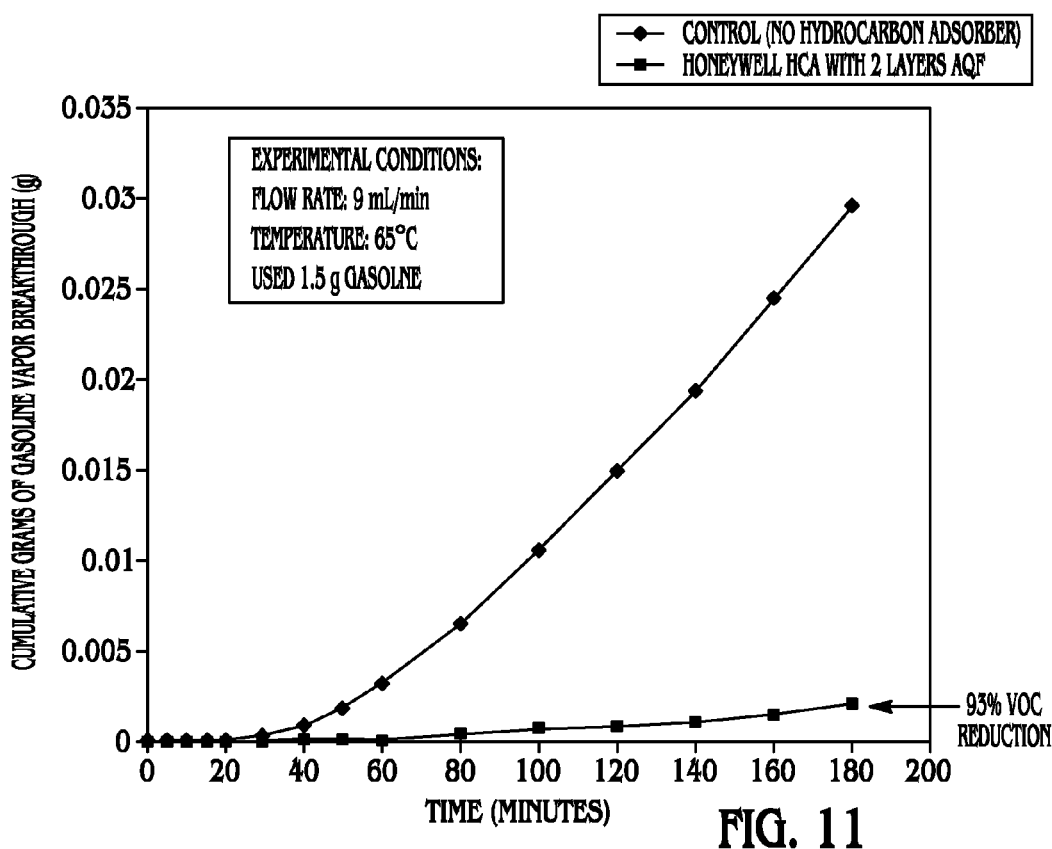
Figure 12:
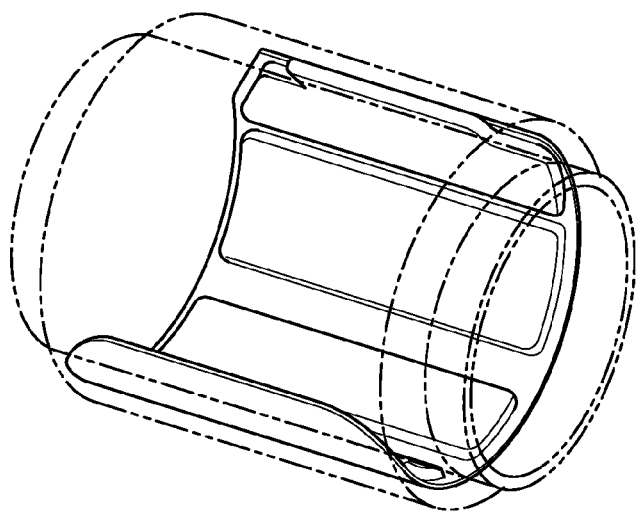
Figure 13:
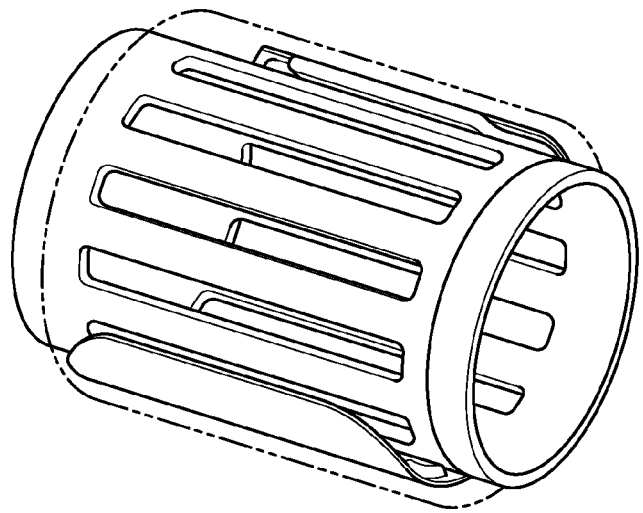
Figure 14:
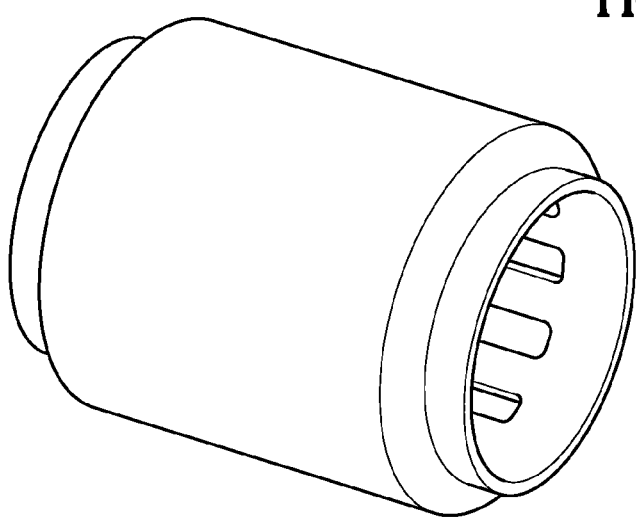
Figure 15:
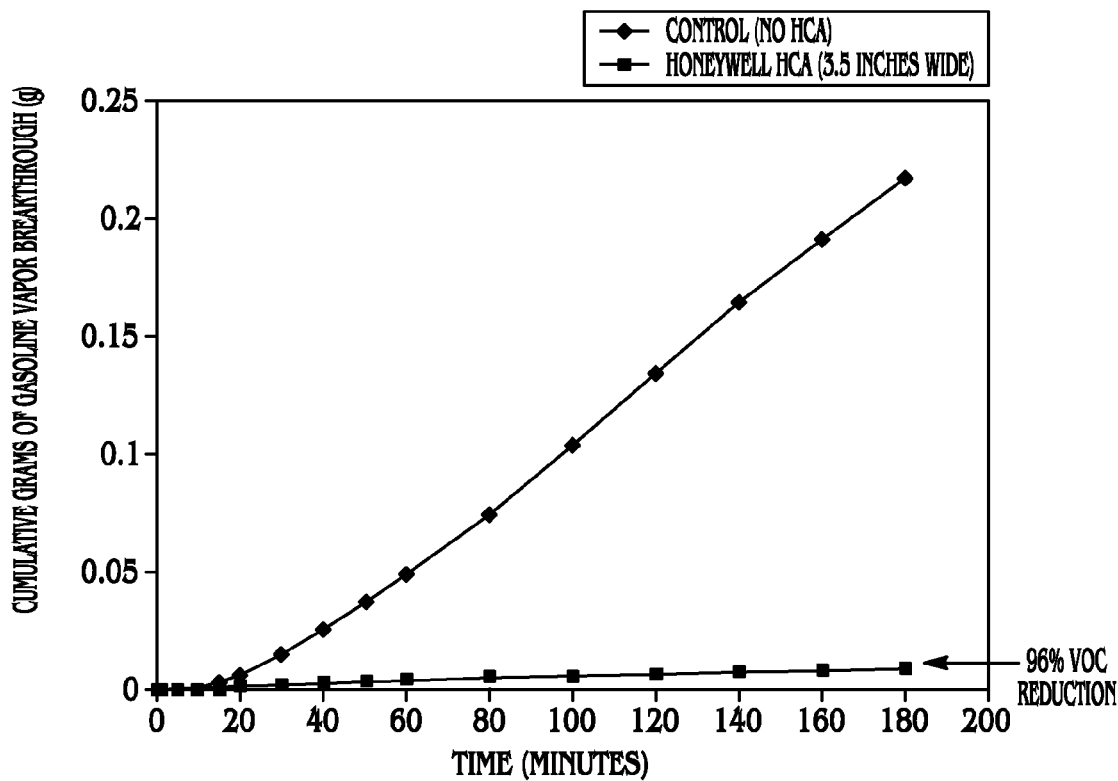
Figure 16:
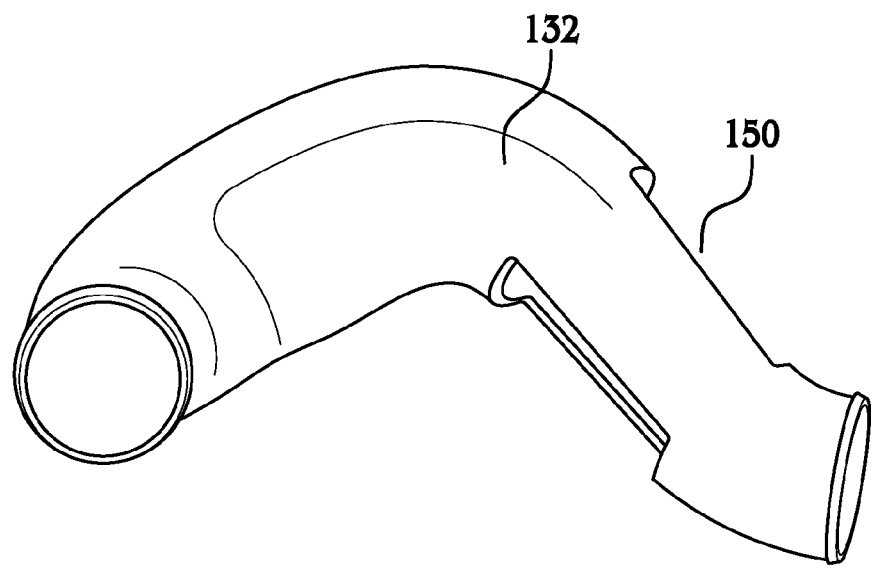
Figure 17:
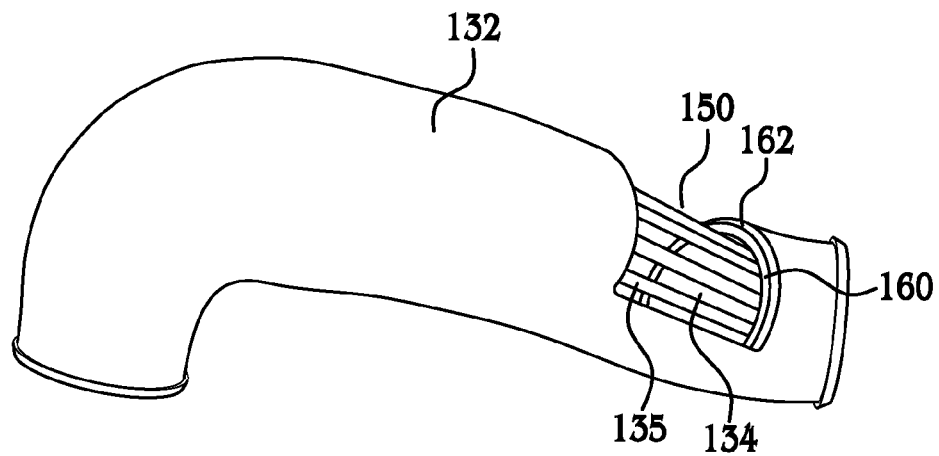
Figure 18:
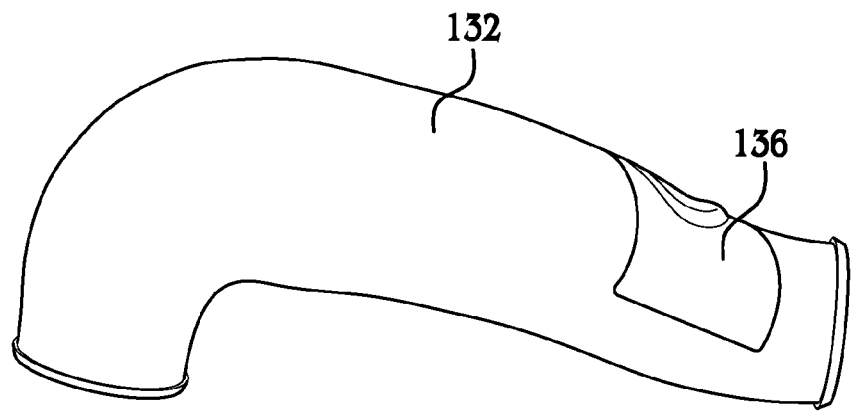
Figure 19:
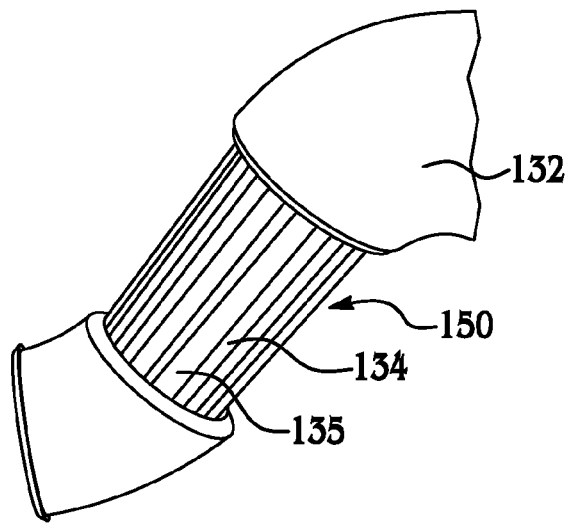

In another non-limiting example, the embodiment of FIGS. 4 and 5 (e.g., adsorber internal to the clean side of the air filter and attached to the closed end of the radial seal air filter) was tested with the following results: performance, restriction=0.6" H2O rise over baseline, breakthrough=95%. FIGS. 10 and 11 illustrate additional testing results of exemplary embodiments of the present invention.

In accordance with an exemplary embodiment of the present invention, a method of adsorbing hydrocarbon vapors from an automotive engine air induction system after engine shut-down is disclosed. The method comprises the step of operatively placing the evaporative emissions filter within the radial seal filter or outside the inlet duct past the mass air flow sensor (the hydrocarbon adsorber may be placed before the Mass Air Flow Sensor in some cases) wherein hydrocarbon vapors present in the air induction system after engine shut-down are substantially retained in the adsorbent member until air flows through the air induction system after the engine starts. Thereafter, the adsorbed hydrocarbons are released back into the air induction system wherein they will be drawn into the engine via the air induction system.

Due to Brownian movement of the hydrocarbon molecules (e.g., random movement of the molecules and collisions with each other of the housing) as well as temperature differences and the confined space of the housing, the hydrocarbons do not travel in the same direction and thus, the hydrocarbon adsorber of the present invention is not required to be a barrier type device (e.g., the air must past through).

Referring now to FIGS. 12-22, yet another alternative exemplary embodiment of the present invention is illustrated. Here, the hydrocarbon adsorber (e.g., carbon containing media) is placed within a cavity 150 disposed on an exterior surface 130 of a clean side duct 132, wherein the cavity has a plurality of openings 134 to allow fluid communication with the adsorber. Once positioned in the cavity, the hydrocarbon adsorber is sealed therein with a cover 136. Cover 136 seals the hydrocarbon adsorber from the environment and prevents hydrocarbon leakage into the atmosphere (Note: For purposes of clarity FIGS. 16-22 illustrate the duct or conduit without the hydrocarbon adsorber disposed in the cavity). As illustrated, a portion of the duct or conduit 132 is shown and the hydrocarbon adsorber is wrapped around a portion of the duct and fluid communication between the hydrocarbon adsorber and the interior of the duct is provided through openings 134. The bottom of the cavity is defined by a plurality of supporting members or ribs 135 that extend between the openings 134. In other words the bottom of the cavity has a plurality of openings bounded by supporting members 135 and the cavity is defined by a plurality of sidewalls 160. Thus, the hydrocarbon adsorber is located within the housing defining the conduit or duct of the air induction system.

In accordance with an exemplary embodiment of the present invention the cavity is position on only a portion of a cross-section of the inlet conduit and the cavity is also positioned above an air flow path through the inlet conduit thus the hydrocarbon adsorber is positioned above an air flow path through the inlet conduit and the hydrocarbon adsorber is only positioned on a portion of the inlet conduit.

In accordance with one alternative exemplary embodiment, the cover is removably secured to the conduit or duct via an interference or "snap fit", wherein a tab or feature of the cover engages a complimentary tab or feature of the conduit. In this embodiment, the cover can be removed for access to cavity 150 in order to replace the hydrocarbon adsorber. In another exemplary embodiment, the cover is permanently sealed to the conduit via any suitable process (e.g., heat staking, adhesives, rivets, welded, etc.). In this embodiment as well as others, the cover is made from the same material as the inlet conduit and the same is welded to the inlet conduit after the hydrocarbon adsorber has been placed in the cavity.

In accordance with an exemplary embodiment, the cover is received in the cavity so that an outer surface of the cover is flush with the outer surface of the conduit. This allows the conduit with the hydrocarbon adsorber to be installed in any vehicular application as the exterior dimensions of the conduit will not vary due to the inclusion of the hydrocarbon adsorber therein. In one exemplary embodiment, the cover rests upon a shoulder portion 162 formed in sidewall 160.

In accordance with an exemplary embodiment, conduit 132 is an aftermarket item sold as a high performance air intake component wherein an existing inlet conduit is replaced by conduit 132 and the replacement conduit 132 also has the hydrocarbon adsorber incorporated therein.

Accordingly and in accordance with exemplary embodiments of the present invention, the adsorber is positioned to adsorb hydrocarbons within the air induction system during engine shutdown and wherein the hydrocarbon adsorber is positioned to adsorb hydrocarbons without disrupting air flow upstream of a mass airflow sensor positioned in the air induction system. In this embodiment, the hydrocarbon adsorber and conduit or duct can be used in air induction systems having radial seal filters, flex panel filters or any other type of air filter housing as the hydrocarbon adsorber is located about the exterior of the conduit or duct of the air induction system. In one non-limiting exemplary embodiment the hydrocarbon adsorber is located on the clean side of the air filter. In one non-limiting exemplary embodiment the hydrocarbon adsorber is located on a conduit that is in fluid communication with the clean side of the air filter. Of course and if applications and performance criteria permit the hydrocarbon adsorber is mounted to an inlet conduit of the air induction system (e.g., the conduit that feeds air into the air filter of the system).

In other alternative exemplary embodiments it is contemplated that various embodiments may be combined to provide further hydrocarbon adsorbtion for example the conduit depicted in FIGS. 1, 2, 6 and 7 may be combined with the radial seal filter of FIGS. 4, 5 and/or the conduit/filter assembly depicted in FIGS. 8 and 9 moreover any of the embodiments of FIGS. 12-22 may be combined with the aforementioned Figures and embodiments thus, multiple hydrocarbon adsorbers may be positioned in or around the conduit and the air filter. Of course, exemplary embodiments also contemplate specific and/or independent applications of the various embodiments described herein.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An inlet conduit for an engine air induction system, comprising:
   a plurality of openings located about a portion of the inlet conduit, the plurality of openings being disposed in a cavity of the inlet conduit;
   a hydrocarbon vapor-adsorbent member disposed in the cavity, the hydrocarbon vapor-adsorbent member covering the plurality of openings; and
   a covering member secured to the inlet conduit, the covering member being configured to cover and seal the hydrocarbon vapor-adsorbent member within the cavity, the covering member having an interior surface and an exterior surface, the interior surface facing the hydrocarbon vapor-adsorbent member while the exterior surface is flush with an exterior surface of the inlet conduit when the covering member is secured to the inlet conduit and wherein hydrocarbon vapors present in the air induction system after engine shut-down are substantially retained in the hydrocarbon vapor-adsorbent member until air flows through the air induction system after the engine starts.

2. The inlet conduit as in claim 1, wherein the hydrocarbon vapor-adsorbent member is a spiral or layered carbon containing media, wrapped or placed concentrically within the cavity.

3. The inlet conduit as in claim 2, wherein the spiral or layered carbon containing media are woven or non-woven cloth fabric formed into a pouch containing loose wood based carbon.

4. The inlet conduit as in claim 1, wherein the hydrocarbon vapor-adsorbent member and the cavity are disposed substantially outside of an air flow path through the inlet conduit and the hydrocarbon vapor-adsorbent member and the cavity are disposed above the air flow path and the hydrocarbon vapor-adsorbent member is disposed only on a portion of a cross-section of the inlet conduit.

5. The inlet conduit as in claim 1, wherein the hydrocarbon vapor-adsorbent member has as a main component thereof comprising a hydrocarbon vapor-adsorbing material comprising at least one of activated carbon, zeolites, cyclodextrins, hydrophobic cellulose, liquid phase absorbents, and mixtures thereof.

6. The inlet conduit as in claim 1, wherein the covering member is removably secured to the inlet conduit and the hydrocarbon vapor-adsorbing material is capable of being removed and replaced from the cavity.

7. The inlet conduit as in claim 1, wherein the covering member is permanently secured to the inlet conduit.

8. The inlet conduit as in claim 1, wherein the inlet conduit comprises a curved section and a straight section, the cavity being located on a portion of the straight section.

9. The inlet conduit as in claim 1, wherein the inlet conduit and the covering member are formed from a plastic material and the covering member is permanently secured to the inlet conduit and the inlet conduit comprises a curved section and a straight section, the cavity being located on a portion of the straight section.

10. The inlet conduit as in claim 1, wherein the cavity is defined by a plurality of sidewalls and the cover rests upon a shoulder portion formed in plurality of sidewalls.

11. The inlet conduit as in claim 10, wherein the cover is removably secured to the inlet conduit via an interference or snap fit.

12. A method for adsorbing hydrocarbon vapors from an air induction system of an internal combustion engine after engine shut down, the method comprising:
   disposing an evaporative emissions filter in a cavity substantially outside of an air flow path defined by an inlet conduit of the air induction system, the cavity being located in a wall of the inlet conduit and is disposed above the air flow path defined by the inlet conduit and the evaporative emissions filter is disposed only on a portion of a cross section of the inlet conduit; and sealing the evaporative emissions filter in the cavity with a cover member, the cover member having an interior surface and an exterior surface, the exterior surface being flushly mounted to an exterior surface of the inlet conduit.

13. The method as in claim 12, wherein the evaporative emissions filter is a hydrocarbon vapor adsorbent member having activated carbon disposed between two layers of a fine mesh screen.

14. The method as in claim 12, wherein the covering member is removably secured to the inlet conduit and the hydrocarbon vapor-adsorbing material is capable of being removed and replaced from the cavity.

15. The method as in claim 12, wherein the covering member is permanently secured to the inlet conduit.

16. The method as in claim 12, wherein the inlet conduit comprises a curved section and a straight section, the cavity being located on a portion of the straight section.

17. The method as in claim 12, wherein the inlet conduit and the covering member are formed from a plastic material and the covering member is permanently secured to the inlet conduit and the inlet conduit comprises a curved section and a straight section, the cavity being located on a portion of the straight section.

18. The method as in claim 12, wherein the cavity is defined by a plurality of sidewalls and the cover rests upon a shoulder portion formed in plurality of sidewalls.

19. The method as in claim 18, wherein the cover is removably secured to the inlet conduit via an interference or snap fit.

\* \* \* \* \*